(12) United States Patent
Xiao

(10) Patent No.: US 10,294,128 B2
(45) Date of Patent: May 21, 2019

(54) DEVICE FOR PREPARING DRINKING WATER BY ELECTROLYSIS

(71) Applicant: DALIAN SHUANGDI INNOVATIVE TECHNOLOGY RESEARCH INSTITUTE CO., LTD., Dalian, Liaoning Province (CN)

(72) Inventor: Zhibang Xiao, Dalian (CN)

(73) Assignee: DALIAN SHUANGDI INNOVATIVE TECHNOLOGY RESEARCH INSTITUTE CO., LTD., Dalian (CN)

(*) Notice: Subject to any disclaimer, the term of this patent is extended or adjusted under 35 U.S.C. 154(b) by 233 days.

(21) Appl. No.: 15/302,037

(22) PCT Filed: Apr. 10, 2015

(86) PCT No.: PCT/CN2015/076246
§ 371 (c)(1),
(2) Date: Oct. 5, 2016

(87) PCT Pub. No.: WO2015/154713
PCT Pub. Date: Oct. 15, 2015

(65) Prior Publication Data
US 2017/0129790 A1    May 11, 2017

(30) Foreign Application Priority Data
Apr. 12, 2014  (CN) .......................... 2014 1 0145755

(51) Int. Cl.
*C02F 1/461* (2006.01)
*C02F 1/467* (2006.01)
*C02F 1/44* (2006.01)

(52) U.S. Cl.
CPC .......... *C02F 1/46104* (2013.01); *C02F 1/444* (2013.01); *C02F 1/4676* (2013.01);
(Continued)

(58) Field of Classification Search
None
See application file for complete search history.

(56) References Cited

U.S. PATENT DOCUMENTS 3,933,614 A * 1/1976 Bunn, Jr. .................. C25B 9/06
                                                      204/260
3,984,303 A * 10/1976 Peters ....................... C25B 9/08
                                                      204/260
(Continued)

FOREIGN PATENT DOCUMENTS

CN         1508074 A     6/2004
CN       101734764 A     6/2010
(Continued)

OTHER PUBLICATIONS

Jun. 29, 2015 International Search Report issued in International Patent Application No. PCT/CN2015/076246.
(Continued)

*Primary Examiner* — Harry D Wilkins, III
(74) *Attorney, Agent, or Firm* — Oliff PLC

(57) ABSTRACT

A device prepares drinking water by electrolysis, belonging to the technical field of equipment for electrolysis of water. The device includes a water container, at least one pair of a cathode and an anode arranged within the water container, and an electrolysis power source used for supplying electricity to the cathode and the anode; a water-permeable membrane is arranged between the coupled cathode and anode, and the water-permeable membrane covers the anode, the range of the distance δ between the water-permeable membrane and the cathode being 0≤δ≤10 mm. The device, when electrolyzing water, can prepare water which has a low oxidation reduction potential, is rich in hydrogen and has a certain sterilization capability and is suitable for drinking.

14 Claims, 8 Drawing Sheets

(52) U.S. Cl.
CPC .. *C02F 1/46109* (2013.01); *C02F 2001/4619* (2013.01); *C02F 2001/46133* (2013.01); *C02F 2001/46138* (2013.01); *C02F 2001/46195* (2013.01); *C02F 2201/46115* (2013.01); *C02F 2201/46175* (2013.01); *C02F 2307/02* (2013.01); *C02F 2307/04* (2013.01); *C02F 2307/10* (2013.01); *Y02E 60/366* (2013.01)

(56) References Cited

U.S. PATENT DOCUMENTS

| | | | | |
|---|---|---|---|---|
| 4,256,554 | A | * | 3/1981 | Bjorkman, Jr. ............ C25B 1/26 204/258 |
| 5,037,518 | A | * | 8/1991 | Young ....................... C25B 1/10 204/228.5 |
| 5,674,365 | A | * | 10/1997 | Sano .................... C02F 1/46109 204/252 |
| 6,235,186 | B1 | | 5/2001 | Tanaka et al. |
| 7,510,633 | B2 | * | 3/2009 | Shimko ..................... C25B 1/10 204/260 |
| 2005/0175337 | A1 | * | 8/2005 | Martin ................. G03C 7/3046 396/611 |
| 2011/0220516 | A1 | * | 9/2011 | Finfrock ................... C25B 1/04 205/628 |
| 2015/0147787 | A1 | * | 5/2015 | Kurihara ................. C13K 1/04 435/99 |

FOREIGN PATENT DOCUMENTS

| | | | |
|---|---|---|---|
| CN | 101805046 | A | 8/2010 |
| CN | 102020341 | A | 4/2011 |
| CN | 103058335 | A | 4/2013 |
| CN | 103932358 | A | 7/2014 |
| CN | 103936108 | A | 7/2014 |
| CN | 103936109 | A | 7/2014 |
| CN | 103936110 | A | 7/2014 |
| CN | 103936111 | A | 7/2014 |
| CN | 103938219 | A | 7/2014 |
| CN | 103938412 | A | 7/2014 |
| CN | 103938413 | A | 7/2014 |
| CN | 103938414 | A | 7/2014 |
| CN | 103940021 | A | 7/2014 |
| CN | 103951015 | A | 7/2014 |
| CN | 103951020 | A | 7/2014 |
| CN | 103951118 | A | 7/2014 |
| CN | 203828015 | U | 9/2014 |
| CN | 203833682 | U | 9/2014 |
| CN | 203833683 | U | 9/2014 |
| CN | 203833684 | U | 9/2014 |
| CN | 203833687 | U | 9/2014 |
| CN | 203833744 | U | 9/2014 |
| CN | 203834031 | U | 9/2014 |
| CN | 203834207 | U | 9/2014 |
| CN | 203834219 | U | 9/2014 |
| CN | 203834220 | U | 9/2014 |
| CN | 203837189 | U | 9/2014 |
| CN | 203938504 | U | 11/2014 |
| CN | 203938505 | U | 11/2014 |
| EP | 0723936 | A2 | 7/1996 |
| GB | 1331251 | A | 9/1973 |
| JP | 2008-080216 | A | 4/2008 |

OTHER PUBLICATIONS

Jun. 29, 2015 Written Opinion issued in International Patent Application No. PCT/CN2015/076246.

Dec. 31, 2014 Office Action issued in Chinese Patent Application No. 201410145755.0.

Aug. 27, 2015 Office Action issued in Chinese Patent Application No. 201410145755.0.

Mar. 27, 2016 Office Action issued in Chinese Patent Application No. 201410145755.0.

* cited by examiner

DEVICE FOR PREPARING DRINKING WATER BY ELECTROLYSIS

BACKGROUND OF THE INVENTION

Technical Field

The present invention relates a water electrolysis device, which belongs to the technical field of water electrolysis equipment.

Description of Related Art

In the reality, water for daily use, in particular living water, is becoming more and more seriously polluted. Physical treating processes are currently available to block and filter out hazardous substances in water by means of medium absorption or by using filtering membranes of various apertures. Absorbing materials are easily saturated and then lose efficiency, and various filtering membranes are easily polluted by bacteria or blocked or damaged by organic substances, so the absorbing materials and the various filtering membranes actually cannot achieve the water purification effect expected according to the theoretical design and cannot even solve the problems of excessive bacteria. On the other hand, along with the social development and improvement in living standards, people have put higher requirements on the health indices of water for daily use. For example, the expected drinking water must be rich in hydrogen and has a low oxidation reduction potential to remove oxygen radicals which is called the "source of all diseases" and bring health to people. At present, electro-chemical water treating technology can relatively meet the comprehensive demands on water for daily use.

Electro-chemical water treatment is a special process of water electrolysis, which can generate hydrogen-enriched beneficial and healthy water with a low oxidation reduction potential and can also generate strong oxidation factors through anode reaction, etc. to sterilize bacteria and degrade various pollutants in the water. For example, a membrane-less device for electrolysis of alkaline water disclosed by a published Chinese patent 1 (Application No.: 201010120654. X) and a membrane-less device for electrolysis of reductive water disclosed by a published Chinese patent 2 (Application No.: 201010525481. X) are mainly invented for the purpose of generating hydrogen-enriched water and have a certain sterilization and purification effect (mainly through direct oxidation at the anode and absorption of active carbon). However, the Chinese patent 1 is disadvantaged because of low electrolysis efficiency and tendency of being overly alkaline. The Chinese Patent 2 reduces and limits the distance $\delta$ between a cathode and an anode to be 5 m$\geq\delta\geq$0 to overcome the defects of the Chinese patent 1, but due to the small range of the distance $\delta$ between the cathode and the anode, the cathode and the anode are inevitably short-circuited because of surface peeling of the active carbon anode. Therefore, the Chinese patent 2 has difficulties to reduce the range of $\delta$ to be below 1 mm in actually. In a word, the two Chinese patents have defects in water preparing efficiency and water purification capabilities and need improvements.

Besides, the pollution degree of daily drinking water varies with water drinking sites due to different devices. To prepare healthy water, to sterilize and purify the water to ensure drinking safety, and to prevent the weakening of biological indices of water caused by excessive sterilization are in needs. However, water treating devices which can improve the healthy indices of water and can adjust the sterilization and purification capabilities of the water according to water drinking sites have not yet been found at present.

BRIEF SUMMARY OF THE INVENTION

Summary of the Invention

From the description of the prior art it is known that, existing water purification treating technologies cannot ensure safety of daily drinking water. The existing water electrolysis technology can only meet single demands of the people for daily drinking water. At present, no electrolysis water device can meet the demands of people on the safety and health of daily drinking water. Specifically speaking, at present no electrolysis water device can effectively prepare hydrogen-enriched water with a low oxidation reduction potential and can effectively control and regulate the amount of the generated oxidation factors to prepare suitable drinking water which can have certain sterilization capabilities according to different demands of people on the safety and health of daily drinking water.

Therefore, the technical problem to be solved by the present invention is to provide a device capable of preparing water, which has a low oxidation reduction potential, is rich in hydrogen and has a certain sterilization capability and is suitable for drinking, by electrolysis.

To solve the technical problems, the present invention discloses the following technical scheme: a device for preparing drinking water by electrolysis includes a water container, at least one pair of a cathode and an anode arranged within the water container, and an electrolysis power source used for supplying electricity to the cathode and the anode; a water-permeable membrane is arranged between the coupled cathode and anode, and the water-permeable membrane covers the anode, the range of the distance $\delta$ between the water-permeable membrane and the cathode being $0\leq\delta\leq10$ mm.

In the above technical scheme, the water-permeable membrane is also called a water-permeable membrane or a water-permeable isolating membrane, referring to a membrane through which water molecules can pass and with water-permeable apertures ranging from a millimeter scale to a nanometer scale. Various filtration membranes used for daily water treatment are included, for example: ultra-filtration membrane (UF), nano-filtration membrane (NF) and micro-filtration membrane (MF), etc.

In the above technical scheme, the water-permeable membrane covering the anode refers to the situation where the water-permeable membrane and the anode are basically of zero space.

The working mechanism of the technical scheme of the present application is stated below.

The water-permeable membrane in the device of the present invention is not a conventional ion membrane, but a membrane which is not used in the water electrolysis field yet. The inventor creatively used the water-permeable membrane as the partition between the cathode and the anode in the water electrolysis device.

The normal reaction of the water electrolysis is as follows: hydrogen (gas) is separated from the cathode, while oxygen (gas) is separated from the anode; $H^+$ ions move toward the cathode area and $OH^-$ ions move toward the anode area. In the device of the present invention, the water-permeable membrane is arranged between the cathode and the anode, separating a battery into two reaction spaces, namely a cathode room and an anode room.

1) The distance δ between the water-permeable membrane and the cathode is greater than zero, which means that the volume of the cathode room is greater than zero, so that the hydrogen separation reaction at the cathode occurs normally to generate hydrogen gas, and water in the cathode room and even in the whole container declines in the oxidation reduction potential.

$$H^+ + e^- \rightarrow H \quad H+H \rightarrow H_2\uparrow \quad H + e^- \rightarrow H^-$$

2) Oxygen separation reaction in the anode room is as follows:

(1) absorption during mass transfer of liquid phase from water to anode surface $$OH^-(water) \rightarrow OH^-(anode\ surface)$$

(2) reaction occurring on the anode surface $$OH^- \rightarrow OH + e^-$$

$$OH + OH \rightarrow O + H_2O$$

$$OH + OH \rightarrow O + e + H_2O$$

$$O + O \rightarrow O_2\uparrow$$

The water-permeable membrane covers the anode, equivalent to the volume of the anode room=0, so the oxygen separation reaction at the anode is interfered by the membrane which covers the anode. High-rate H₂O generated by a desorption transform reaction occurring at the anode and oxygen gas separated by the anode cannot be released anywhere and can only overcome the water-permeable resistance of the water-permeable membrane to pass numerous microporous channels in the membrane to move toward the cathode room.

3) In the device of the present invention, numerous microporous water-saving spaces in the membrane are equivalent to a plurality of micro-aqueous resistors connected in parallel in the electrolysis current channels in the cathode and the anode. The distance δ between the cathode and the membrane is very small, so the aqueous resistance drop of the cathode room can be negligible; besides, electrolysis voltage mainly works on the water-permeable membrane, thus the unit voltage strength in every micropore is extremely high. Moreover, the water-permeable apertures of the water-permeable membrane are very small (from micrometer-scale to nanometer-scale), and high-energy electrons released from the cathode are concentrated in the micro pores, equivalent to a decomposition of a large discharging electrode (cathode) into numerous small-curvature-radius electrodes. Therefore, the oxidation reduction reaction of the water electrolysis can fully proceed in the micro pores of the water-permeable membrane; O₂ moving from the anode to the micro pores of the membrane are bombed by high-energy electrons in strong electric fields to generate oxygen bubbles and actuate a chain reaction which induces the water itself to gasify to generate a continuous and stable plasma discharging in the micro pores and to generate a great amount of oxidation factors, and the oxidation factors are finally dispersed in the water in the container through the cathode area.

From the above reaction process it is known that, by creatively arranging the water-permeable membrane between the cathode and anode and covering the anode with the water-permeable membrane to control the distance between the water-permeable membrane and the anode, the present invention brings about the following direct beneficial effects:

1) The device of the present invention can prepare the beneficial hydrogen-enriched and healthy water with a low oxidation reduction potential, can generate considerable strong oxidation factors in water, and compared with the existing other hydrogen-enriched preparation technologies, has greatly improved the sterilization and purification capabilities thereof.

2) The water-permeable membrane can usually be very thin (for example, the thickness of the ultra-filtering membrane can be 0.1 mm~0.5 mm). After the membrane is arranged between the cathode and the anode, the distance between the cathode and the anode can be stably kept within a range which is basically equal to the thickness of the membrane; the electrolysis voltage may be very low in the same case, and even one piece of 3.7V lithium battery for power supply can generate a working current of over 2 A, which cannot be achieved by the prior art. Besides, due to efficient reaction factors such as plasma discharge generated in the membrane, the actual power consumption of the present invention is greatly reduced in comparison with similar devices. When the anode made from carbon materials is covered, short-circuiting caused by peeling of carbon particles can be effectively prevented.

3) By proper selection and adjustment of the membrane, the electrode properties, etc., the generation of the oxidation factors in water can be controlled to meet demands for drinking water at different sites.

In the device of the present invention, the size of the water-permeable aperture of the water-permeable membrane further influences the water treating effect of the device. The small water-permeable aperture brings a good effect of inhibiting the oxygen separation and gasification reaction at the anode, and the reduction of the water-permeable aperture is equivalent to the reduction of the curvature radius of a discharging electrode, which aids in plasma discharging. However, if the water-permeable aperture is too small and excessively inhibits the oxygen separation and gasification reaction at the anode, which is equivalent to a great increase of the oxygen separation potential of the anode, then the electrolysis current between the cathode and the anode is greatly reduced under the condition that the external electrolysis voltage is unchanged, resulting in a failure of expected various reactions in the device of the present invention. In addition, the water-permeable aperture of the membrane is also concerned with various factors such as the mechanical strength of the membrane. Through repeated tests in practice, taking different water demands into comprehensive consideration, the device of the present invention selects the water-permeable membranes with apertures ranging from 2 mm to 1 nm, including ultra-filtering membranes, nano-filtering members and micro-filtering membranes for treatment of daily living water. As an improvement of the technical scheme of the present invention, the water-permeable membrane has a water-permeable aperture which is smaller than or equal to 2 mm and greater than or equal to 1 nm.

As the first improvement of the technical scheme of the present invention, the water-permeable membrane is a single-layer water-permeable membrane or a multi-layer water-permeable membrane, wherein the single-layer water-permeable membrane can be an ultra-filtering membrane or a water-permeable membrane made from carbon materials; the multi-layer water-permeable membrane is compounded by superimposing at least two layers of water-permeable membranes, one of which, close to the anode, is a water-permeable membrane made from carbon materials.

By the first improvement of the technical scheme of the present invention, it can be ensured that the hydrogen separation reaction proceeds normally and hazardous substances in water are absorbed into active carbon membranes and oxidized and degraded in the active carbon membranes, while oxidation materials in water are inhibited in a proper range to prevent a deterioration of biological indices. The device is particularly suitable for treating living water for the purpose of "drinking". Furthermore, if the water-permeable membrane is compounded by superimposing at least two layers of water-permeable membranes, one of which, close to the anode, has conductivity and micro-meter apertures (for example the membrane is made from conductive ceramic or active carbon fibers), further changes will be generated:

1) Due to good conductivity, the membrane generates a very small voltage drop, ensuring that the plasma discharging in water mainly occurs in the non-conductive water-permeable membrane (generally selected as ultra-filtering membrane) with smaller water-permeable apertures and close to the cathode.

2) Due to the porosity of the media, on the one hand, the inhibition of oxygen separation at the anode is strengthened, and on the other hand, pollutants in the source water can be absorbed in conductive ceramic or active carbon fiber pores and undergo direct oxidation and indirect oxidation of the anode to be deeply degraded and removed.

3) The membrane can well absorb residual chlorine in the water, and convert the residual chlorine into hazard-less chlorine ions by the effect of the anode, greatly reducing the risk of generating toxic side products by the residual chlorine in the water.

As the second improvement of the technical scheme of the present invention, the covering relationship between the water-permeable membrane and the anode may be that the water-permeable membrane covers the entire surface of the anode or the water-permeable membrane covers a part of the surface of the anode; when covering a part of the surface of the anode, the water-permeable membrane preferably covers the surface of one side (namely the main reaction surface), facing the cathode, of the anode.

As the third improvement of the technical scheme of the present invention, the cathode is formed with first through-holes the apertures of the first through-holes being greater than 1 mm. By such improvement, the cathode reaction can fully proceed and hydrogen bubbles generated in the space between the cathode and the membrane can be well exported.

As the fourth improvement of the technical scheme of the present invention, the water-permeable membrane is formed with second through-holes the apertures of the second through-holes being greater than 2 mm. The water-permeable membrane is formed with the second through-holes, practically equivalent to the generation of a plurality of small membrane-less electrolysis areas or equivalent to the introduction of superimposed conventional membrane-less electrolysis reactions, which is capable of properly changing the water treating effect of the device of the present invention, for example adjusting the pH value of water. The second through-holes are different from the water-permeable apertures of the water-permeable membrane in that the water-permeable apertures are an inherent part of the membrane while the second through-holes are additionally formed.

As the fifth improvement of the technical scheme of the present invention, the electrolysis power supply is a DC pulse power source or an AC pulse power source with a high level and a narrow pulse width, and the forward voltage of the AC pulse power source is greater than the backward voltage.

As a first extended application of the technical scheme of the present invention, the present invention provides a water cup, the water cup adopting the technical scheme of the present invention.

As a second extended application of the technical scheme of the present invention, the present invention provides a kettle, the kettle adopting the technical scheme of the present invention.

As a third extended application of the technical scheme of the present invention, the present invention provides a kettle, the kettle adopting the technical scheme of the present invention.

As a fourth extended application of the technical scheme of the present invention, the present invention provides a thermos bottle, the thermos bottle adopting the technical scheme of the present invention.

As a fifth extended application of the technical scheme of the present invention, the present invention provides a water dispenser, the water dispenser adopting the technical scheme of the present invention.

As a sixth extended application of the technical scheme of the present invention, the present invention provides a boiler, the boiler adopting the technical scheme of the present invention.

As a seven extended application of the technical scheme of the present invention, the present invention provides a tea making machine, the tea making machine adopting the technical scheme of the present invention.

BRIEF DESCRIPTION OF THE SEVERAL VIEWS OF THE DRAWINGS

The device for preparing drinking water by electrolysis of the present invention is described in further detail in conjunction with the attached drawings.

DETAILED DESCRIPTION OF THE INVENTION

Embodiment 1

Figure 1:
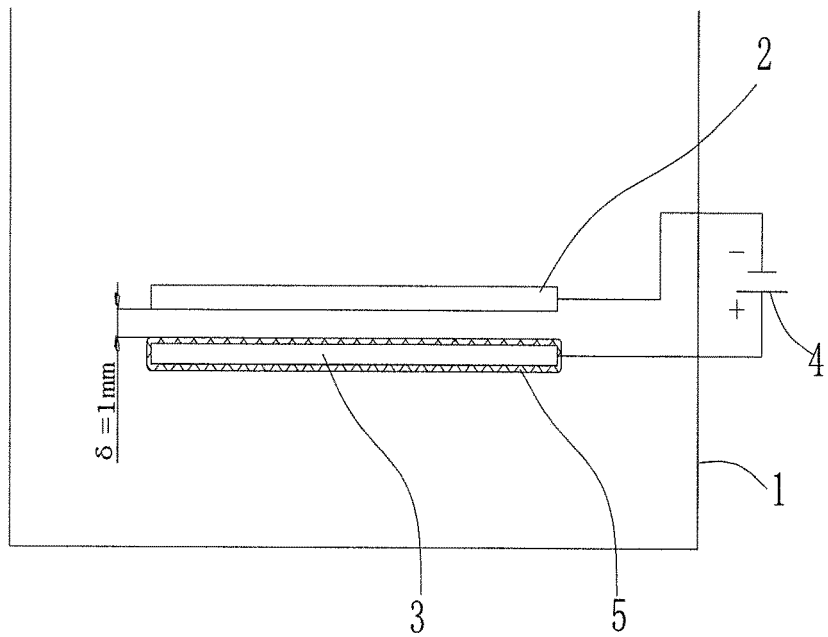
FIG. 1 is a structural view of a device for preparing drinking water by electrolysis according to a first embodiment of the present invention.

The device for preparing drinking water by electrolysis of embodiment 1 can be seen in FIG. 1, including a water container 1, one pair of a cathode 2 and an node 3 arranged within the water container, and an electrolysis power source 4 used for supplying electricity to the cathode 2 and the anode 3. The water container 1 of embodiment 1 is an open container. A water-permeable membrane 5 is arranged between the coupled cathode 2 and anode 3, and the water-permeable membrane 5 covers the anode 3, the range of the distance δ between the water-permeable membrane 5 and the cathode 2 being 1 mm. In embodiment 1, the water-permeable membrane 5 is a single-layer PVDF ultra-filtering membrane (poly (vinylidene fluoride) membrane) with a mean water-permeable aperture of 0.03 μm, and a thickness of 0.01 mm. Of course, the ultra-filtering membrane in embodiment 1 can be ultra-filtering membranes of other materials as long as the range of the mean water-permeable aperture is 0.01-0.05 μm.

In embodiment 1, the water-permeable membrane 5 covers the entire surface of the anode 3, namely wrapping the entire surface of the anode 3.

In embodiment 1, the cathode 2 is an inertia electrode prepared by platinum-coated titanium oxides (coating thickness 0.8 mm), the cathode 2 is shaped like a round plate; and the anode 3 is made from carbon materials such as graphite or active carbon, with a rectangular shape. The cathode and the anode are both not formed with pores on surfaces thereof.

In embodiment 1, the electrolysis power source 4 is a 30V DC pulse power source which has a high level, a narrow pulse width and is voltage-stabilized, or an AC pulse power source (but the forward voltage must be greater than the backward voltage).

In embodiment 1, when the cathode 2 and the anode 3 are placed in parallel in water in the water container 1, the cathode 2 is positioned above the anode 3.

The device for preparing drinking water by electrolysis in embodiment 1 was used in water electrolysis tests. The volume of the water container 1 was 200×80×120 mm. The source water was water generated by a RO pure water machine, with a TDS=3 mg/L. The water container was injected with about 1.5 L of water. The electrolysis was carried out for about 30 min, and water sample was taken and tested once every 5 min.

In the following tests, the amount of bubbles (strength) and oxidation factors in water are tested by qualitative observation.

(1) Classification of Bubbles (Strength) in Water by Visual Inspection:

Bubbles in the water were classified into 5 levels from zero to the relative maximum bubble amounts in the test.

(2) Determination of Oxidation Factors in Water

As mentioned above, oxidation factors exist in a very short time in water. The analysis selectivity and reliability of the existing test methods (for example chemical reaction method and capturing method) are undesirable. Meanwhile, considering that the device of the present invention is specially designed for treatment of water for daily use, the focus is on the change trend-scale macro effect of the oxidation factors. Therefore, to simplify the repeated test workload, a titrating solution researched and developed especially for qualitative determination of the sum of the oxidation factors in water. The self-made titrating solution in the water and the yellowing degree of the water are observed and then classified into 5 levels to judge the contents of the oxidation factors in the water:

Color-less—Basically zero oxidation factor in the water, set as level 0;

Yellowest—Relative maximum oxidation factors in the water, set as level 5.

Except for the color-less or the yellowest, the color in the middle is classified into levels 1, 2, 3 and 4 according to the yellowing degree.

The test results can be seen in table 1 below:

TABLE 1

| Electrolysis time-Min | Bubble properties Displacement of water - combustion | Amount of bubbles | ORP (mv) | pH | Oxidation factors (titration) | Dissolved hydrogen (ug/L) |
|---|---|---|---|---|---|---|
| 0 |  | Level 0 | 251 | 6.8 | Level 0 | 0 |
| 5 | Hydrogen | Level 2 | −196 | 7.1 | Level 0 | 255 |
| 10 |  | Level 3 | −268 | 7.3 | Level 0 | 346 |
| 15 |  | Level 4 | −304 | 7.4 | Level 1 | 462 |
| 20 |  | Level 5 | −386 | 7.6 | Level 1 | 587 |
| 30 |  | Level 5 | −405 | 7.7 | Level 2 | 625 |

Test result analysis:
1. By the displacement of air-combustion method and measurement of the contents of the dissolved hydrogen in water, it can be determined that the majority of the huge amount of bubbles generated in water were hydrogen bubbles.
2. Along with an increase in the electrolysis time, hydrogen and oxidation factors in water increased in a direct proportion.
3. Absorbed by the carbon material itself of the anode 3, the oxidation factors generated in water were reduced, and then water suitable for drinking was obtained.

Embodiment 2

Figure 2:
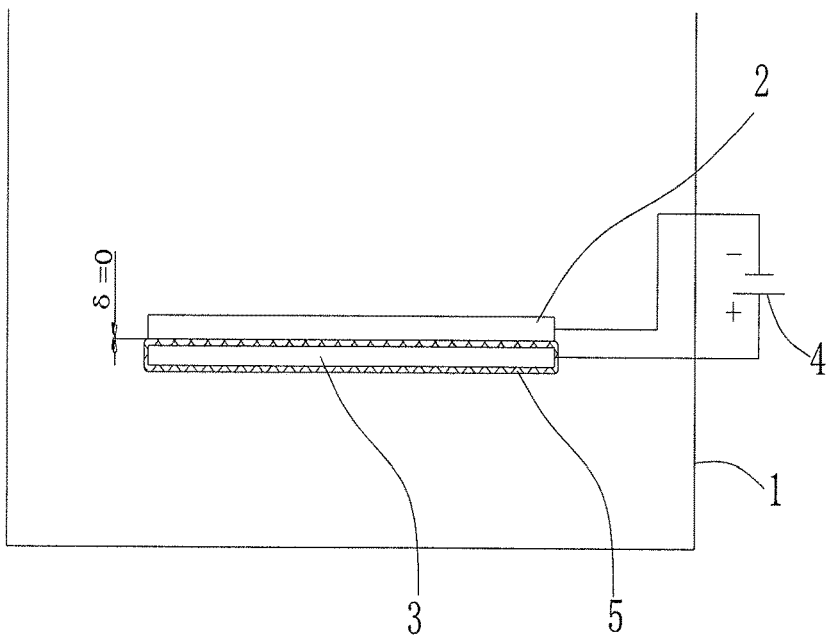
FIG. 2 is a structural view of a device for preparing drinking water by electrolysis according to a second embodiment of the present invention.

The device for preparing drinking water by electrolysis in embodiment 1 is basically the same as that in embodiment 1. As shown in FIG. 2, embodiment 2 is different from embodiment 1 in that, the distance δ between the water-permeable membrane 5 and the cathode 2 is 0 mm, meaning that the water-permeable membrane 5 tightly covers the cathode 2 and the anode 3. The water-permeable membrane 5 is a single-layer PVDF ultra-filtering membrane (poly (vinylidene fluoride) membrane) with a mean water-permeable aperture of 0.03 μm, and a thickness of 0.01 mm.

The device for preparing drinking water in embodiment 2 and the device in embodiment 1 were used to do the water electrolysis test; the source water was tap water, with a ORP=+320 mv, a pH=7.1 and a TDS=48 mg/L; other test conditions were the same as those in embodiment 1. The test results of the devices can be seen in the table 2 below.

TABLE 2

| Electrolysis mode | Current ma | Voltage V | Bubbles | | Dissolved hydrogen ppb | ORP mv 320 | pH 7.1 | Oxidation factors Reagent titration |
|---|---|---|---|---|---|---|---|---|
| | | | Visual inspection | Main properties | | | | |
| δ = 1 | 560 | 8 | Level 5 | Hydrogen | 600 | −553 | 8.2 | Level 0 |
| δ = 0 | | 6.3 | Level 5 | Hydrogen, little oxygen | 505 | −464 | 7.2 | Level 1 |

Test result analysis:
1) In a certain range, as δ increased, bubbles and oxygen in the water increased, the reduction oxidation potential declined, the water became strongly alkaline and oxidation factors reduced.
a) δ approached 0 and the oxidation factors in the treated water increased.

Embodiment 3

Figure 3:
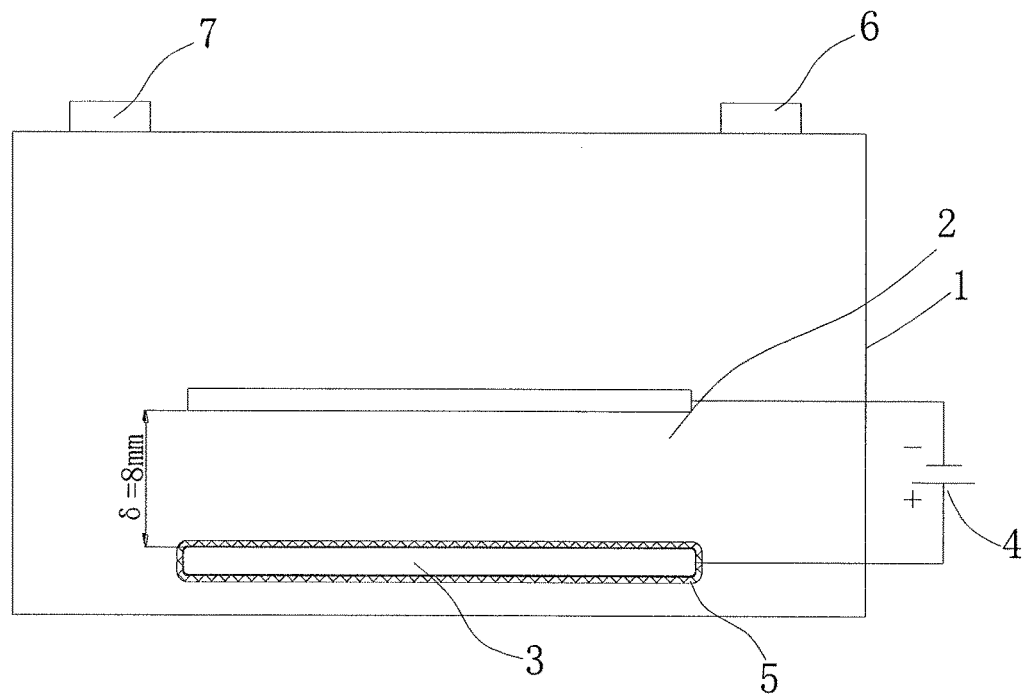
FIG. 3 is a structural view of a device for preparing drinking water by electrolysis according to a third embodiment of the present invention.

The device for preparing drinking water by electrolysis in embodiment 3 is basically the same as that in embodiment 1. As shown in FIG. 3, embodiment 3 is different from embodiment 1 in that, 1) the water container 1 is a closed container, provided with a water inlet 6 and a water outlet 7; 2) the water-permeable membrane 5 is an active carbon fiber fabric (with a specific surface area of 1,200 m²/g, and a thickness of 1.8 mm when impacted after being immersed in water); 3) the distance δ between the water-permeable membrane 5 and the cathode 2 is 8 mm.

For the device for preparing drinking water by electrolysis in embodiment 3, the carbon materials of the anode 3 and the water-permeable membrane 5 have a strong absorption capability, so that oxidation factors generated in water are greatly reduced and then water more suitable for drinking is obtained.

Embodiment 4

Figure 4:
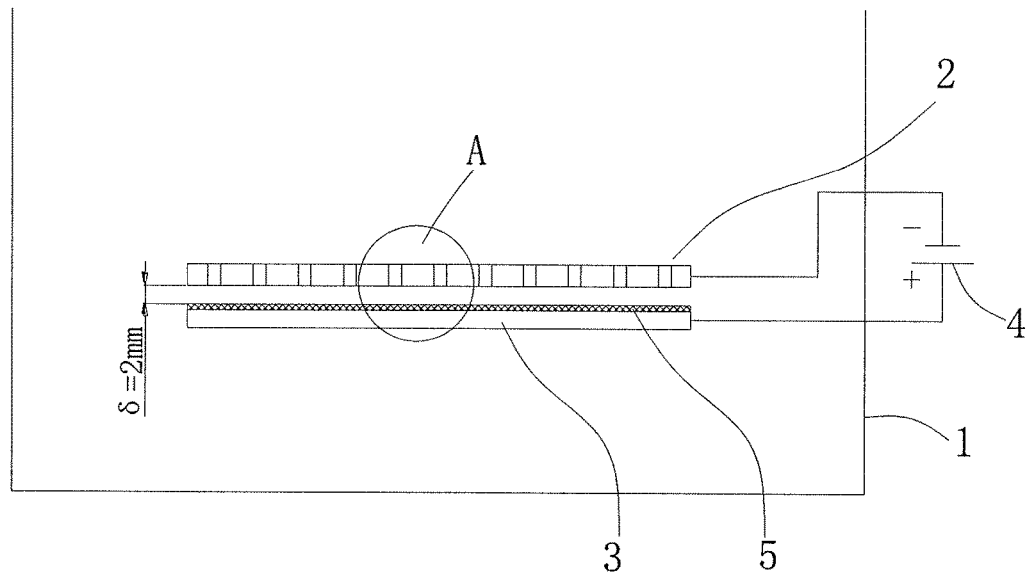
FIG. 4 is a structural view of a device for preparing drinking water by electrolysis according to a fourth embodiment of the present invention.
Figure 5:
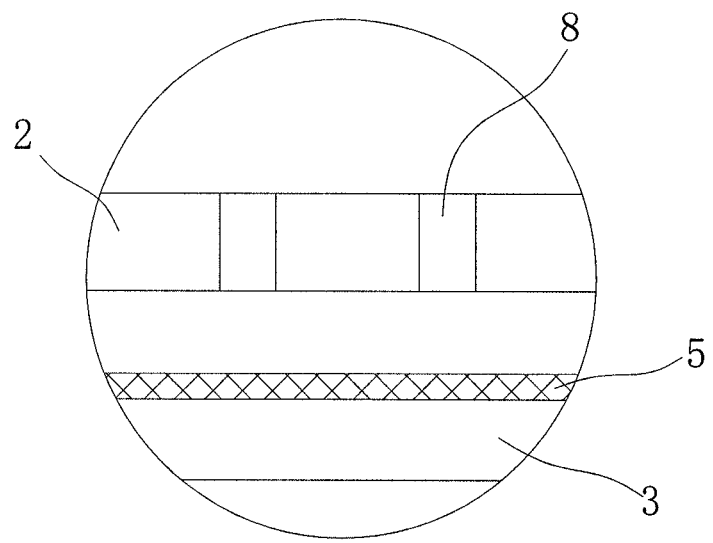
FIG. 5 is a partially enlarged view of portion A in FIG. 4.

The device for preparing drinking water by electrolysis in embodiment 4 is basically the same as in embodiment 2. As shown in FIG. 4 and FIG. 5, embodiment 4 is different from embodiment 2 in that, 1) the cathode 2 is formed first with 8 through-holes with an aperture of 1 mm; 2) the water-permeable membrane 5 covers a part of the surface of the anode 3 (all surface of one side, facing the cathode 2, of the anode); 3) the distance δ between the water-permeable membrane 5 and the cathode 2 is 2 mm.

The device for preparing drinking water by electrolysis in embodiment 4 was used to make a water electrolysis test. The cathode of the device was uniformly distributed with 24 first through-holes with a diameter φ of 1 mm; the electrolysis time was 20 min; and other test conditions and test method were the same as those of embodiment 1. The test results can be seen in the table 3 below.

TABLE 3

| Electrolysis current (mA) | Oxidation reduction potential (ORP) (mv) | pH | Dissolved hydrogen (mg/L) | Amount of active hydrogen in water |
|---|---|---|---|---|
| 270-390 | −498 | 7.9 | 760 | Level 1 |

Embodiment 5

Figure 6:
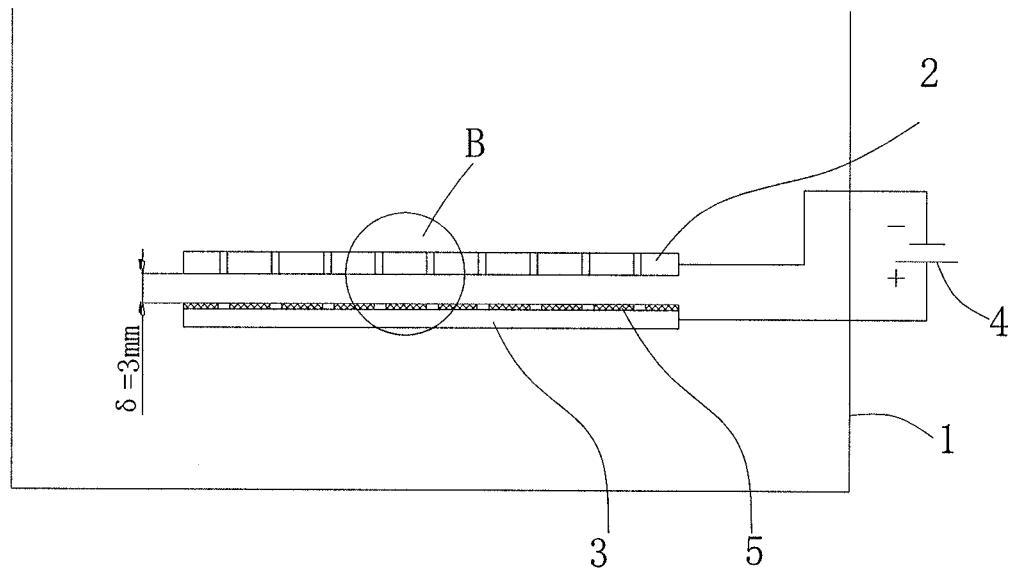
FIG. 6 is a structural view of a device for preparing drinking water by electrolysis according to a fifth embodiment of the present invention.
Figure 7:
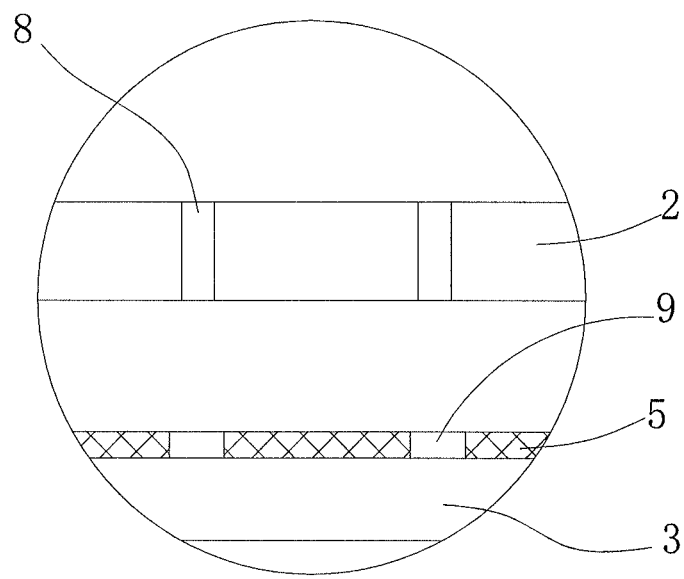
FIG. 7 is a partially enlarged view of portion B in FIG. 6.

The device for preparing drinking water by electrolysis in embodiment 5 is basically the same as in embodiment 4. As shown in FIG. 6 and FIG. 7, embodiment 5 is different from embodiment 4 in that, 1) the water-permeable membrane 5 is formed with second through-holes 9 with an aperture of 2.1 mm), and the second through-holes 9 and the first through-holes 8 are identical in quantity and are concentrically aligned; 2) the distance δ between the water-permeable membrane 5 and the cathode 2 is 3 mm.

The device for preparing drinking water by electrolysis in embodiment 4 was used to make a water electrolysis test. The electrolysis time was 20 min; and other test conditions and test method were the same as those of embodiment 4. The test results can be seen below:

TABLE 4

| Electrolysis current (mA) | Oxidation reduction potential (ORP) (mv) | pH | Dissolved hydrogen (mg/L) | Amount of active hydrogen in water |
|---|---|---|---|---|
| 520 | −410 | 8.2 | 650 | Level 1 |

Embodiment 6

Figure 8:
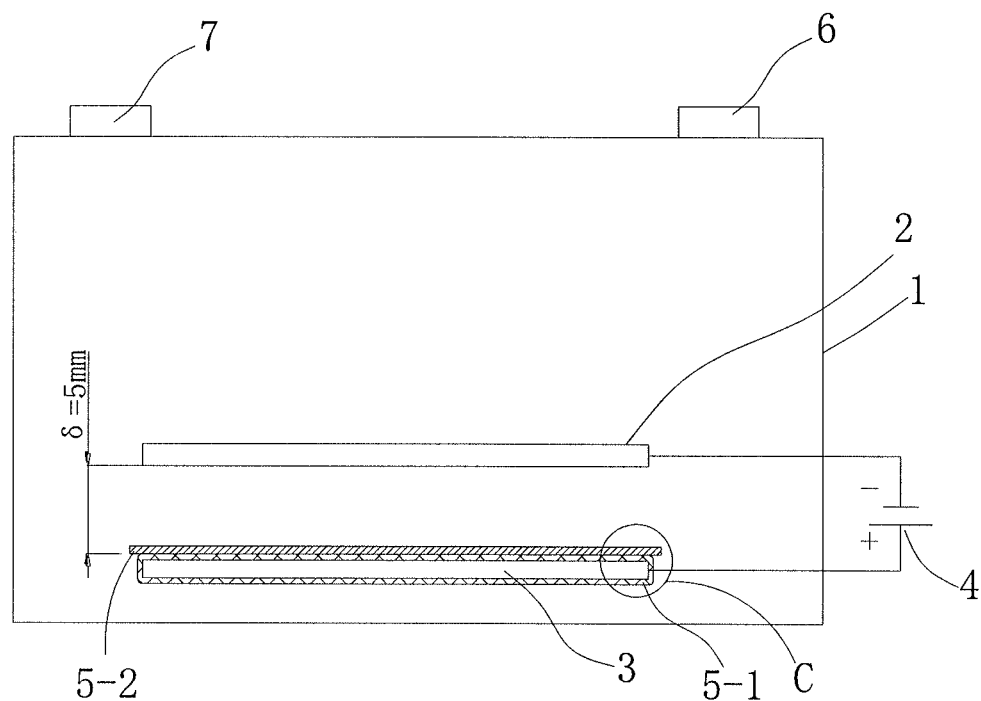
FIG. 8 is a structural view of a device for preparing drinking water by electrolysis according to a sixth embodiment of the present invention.
Figure 9:
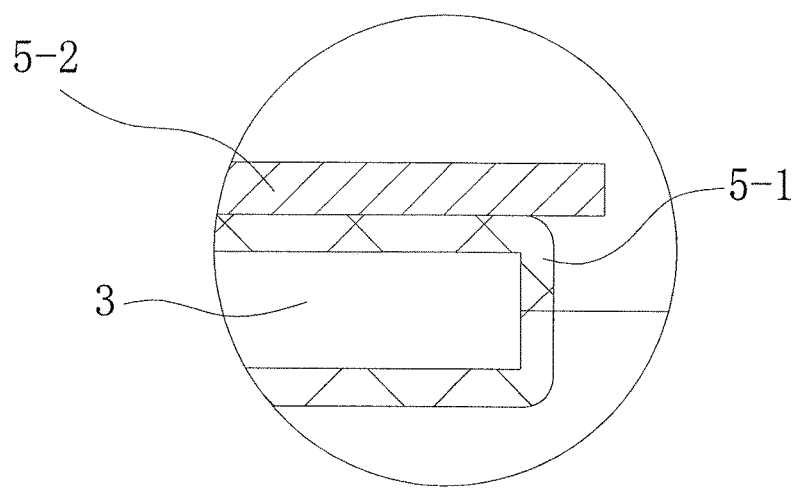
FIG. 9 is a partially enlarged view of portion D in FIG. 8.

The device for preparing drinking water in embodiment 6 is improved on the basis of embodiment 3. As shown in FIG. 8 and FIG. 9, embodiment 6 is different from embodiment 3 in that, 1) the water-permeable membrane 5 is a two-layer water-permeable membrane compounded by superimposing an active carbon fiber membrane (felt) 5-1 and an ultra-filtering membrane 5-2; the active carbon fiber membrane 5-1 is close to the anode 3 (facing the anode 3) and covers the entire surface of the anode 3, while the ultra-filtering membrane 5-2 facing the cathode 2 (departing from the anode 3) covers a part of the surface (the entire surface of one side, facing the cathode 2, of the anode), and the two ends of the ultra-filtering membrane 5-2 exceeds the anode a little); 2) the distance δ between the water-permeable membrane 5 and the cathode 2 is 5 mm; 3) the anode 3 is changed to be an inertia electrode, like the cathode 2, made from platinum-coated titanium oxides (coating thickness 0.8 mm), shaped like a round plate.

The device for preparing drinking water by electrolysis in embodiment 6 was used to do a water electrolysis test. The electrolysis time was 20 min; and other test conditions were the same as those of embodiment 5. The test results can be seen in table 5 below.

TABLE 5

| Electrolysis current (mA) | Oxidation reduction potential (ORP) (mv) | pH | Dissolved hydrogen (mg/L) | Amount of active hydrogen in water |
|---|---|---|---|---|
| 580 | −360 | 7.7 | 380 | Undetected |

From the test results it can be known that the device for preparing drinking water by electrolysis in embodiment 6 can prepare hydrogen-enriched water with a low oxidation reduction potential which is suitable for drinking because the water-permeable membrane 5 is a two-layer hydrogen-enriched water which is compounded by superimposing the active carbon fiber membrane (felt) 5-1 and the ultra-filtering membrane 5-2 and can absorb a great amount of the oxidation factors in water.

Embodiment 7

Figure 10:
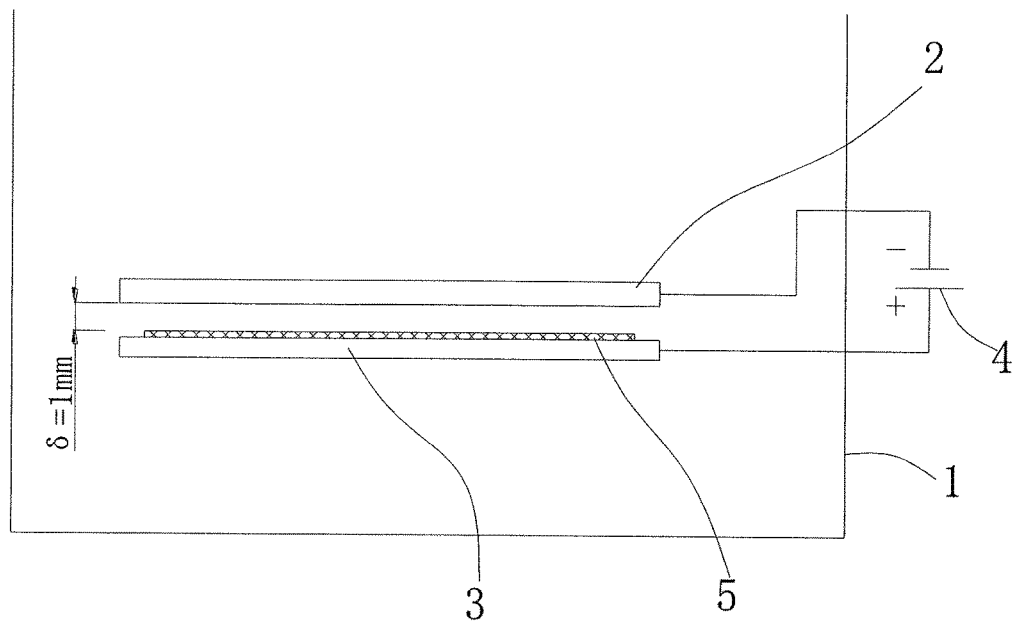
FIG. 10 is a structural view of a device for preparing drinking water by electrolysis according to a seventh embodiment of the present invention.

The device for preparing drinking water by electrolysis in embodiment 7 is basically the same as that in embodiment 1. As shown in FIG. 10, embodiment 7 is different from embodiment 1 in that, the water-permeable membrane 5 tightly covers a part of the surface of one side, facing the cathode 2, of the anode 3, and the two ends of the anode 3, respectively, exceed the water-permeable membrane 5 by a small length.

The device for preparing drinking water by electrolysis in embodiment 4 was used to do a water electrolysis test. The electrolysis time was 10 min; and other test conditions were the same as those of embodiment 5. The test results can be seen in table 5 below.

TABLE 6

| Electrolysis time-Min | Amount of bubbles | ORP (mv) | Oxidation factors pH (titration) | Dissolved hydrogen (ug/L) |
|---|---|---|---|---|
| 0 | Level 0 | 251 | 6.8 Level 0 | 0 |
| 10 | Level 5 | −368 | 7.4 Level 0 | 489 |

Embodiment 8

Figure 11:
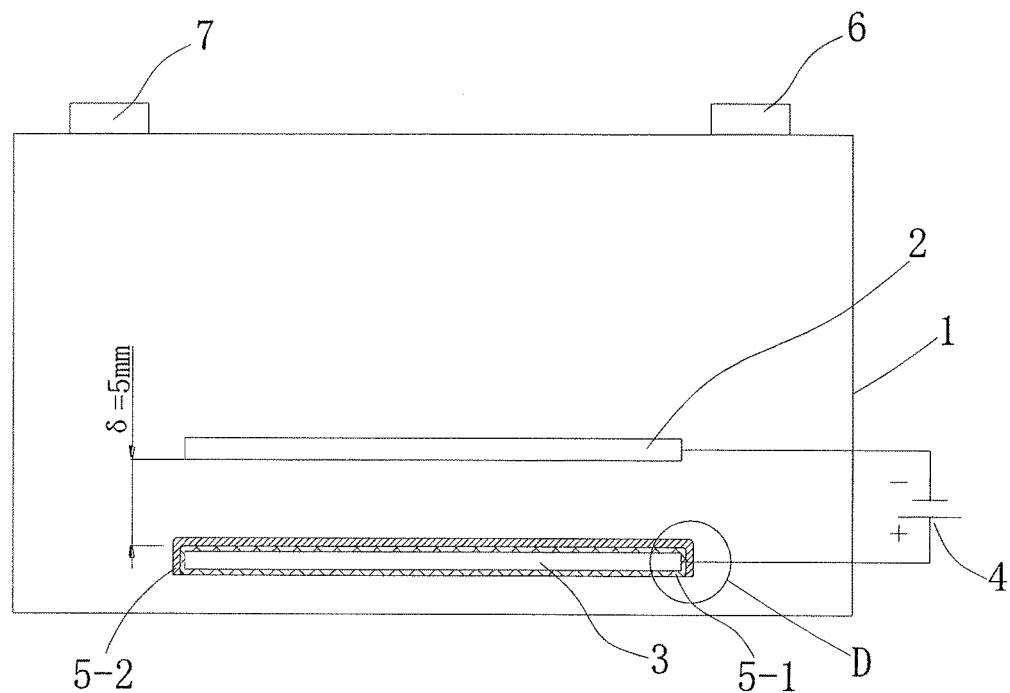
FIG. 11 is a structural view of a device for preparing drinking water by electrolysis according to an eighth embodiment of the present invention.
Figure 12:
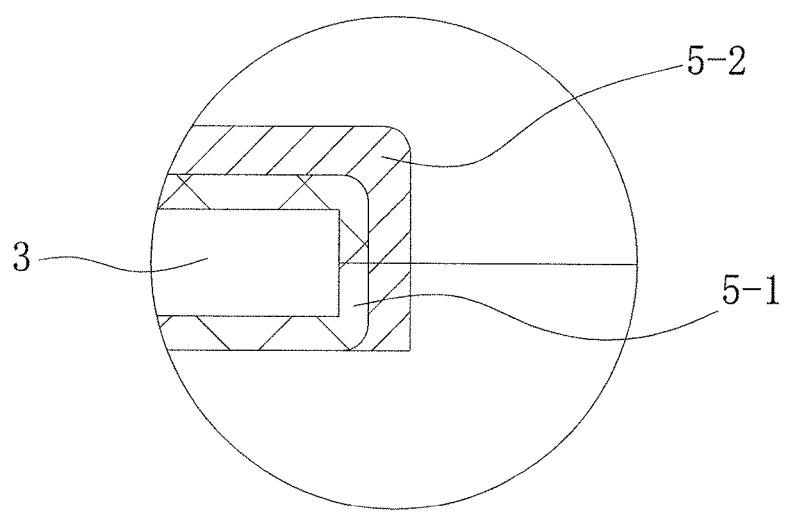
FIG. 12 is a partially enlarged view of portion C in FIG. 11.

The device for preparing drinking water by electrolysis in embodiment 8 is a variation on the basis of embodiment 6. As shown in FIG. 11 and FIG. 12, embodiment 8 is different from embodiment 6 in that, 1) the active carbon fiber membrane (felt) 5-1 is replaced by the water-permeable membrane made from conductive ceramic; 2) the ultra-filtering membrane 5-2 facing the cathode 2 (departing from the anode 3) covers a part of the surface of the anode 3, namely covering three side surfaces of the anode.

Embodiment 9

Figure 13:
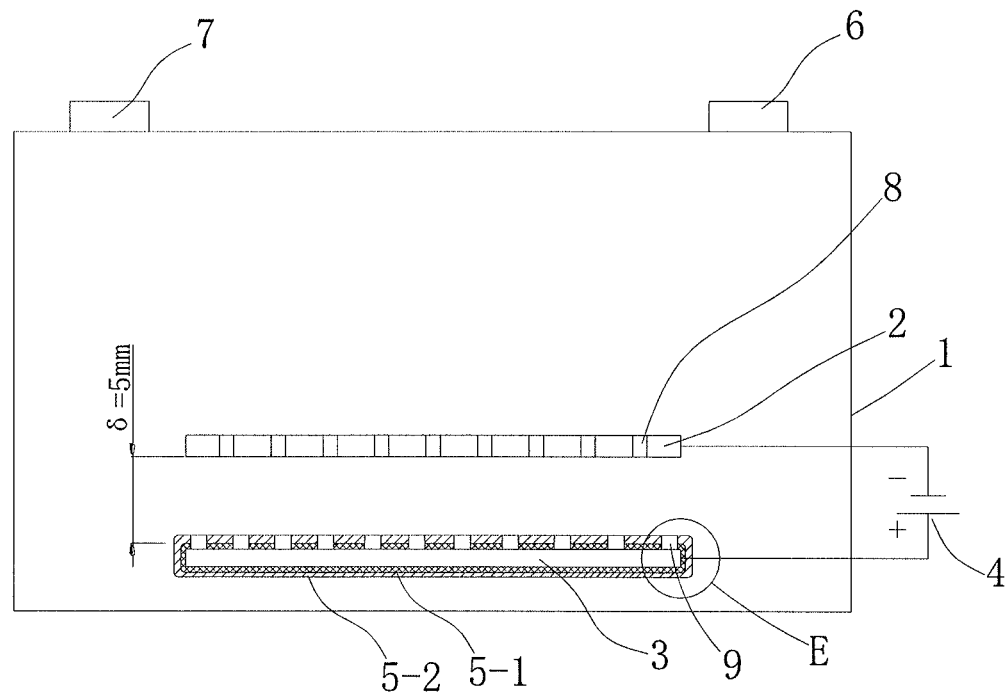
FIG. 13 is a structural view of a device for preparing drinking water by electrolysis according to a ninth embodiment of the present invention.
Figure 14:
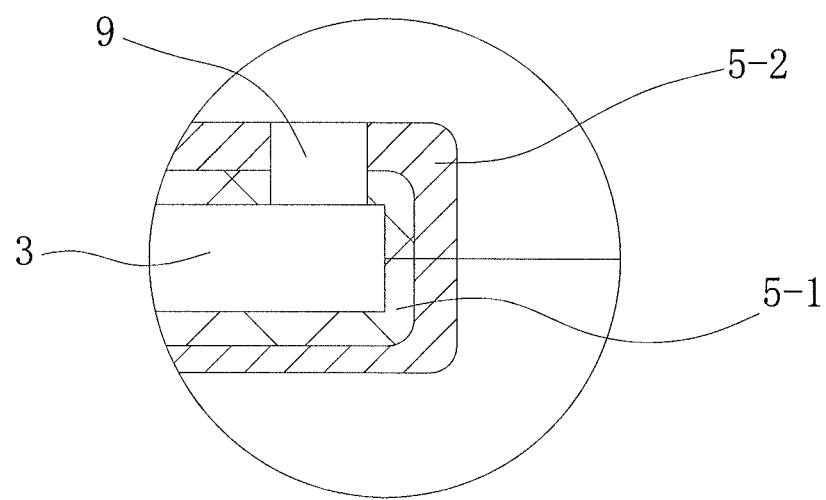
FIG. 14 is a partially enlarged view of portion E in FIG. 13.

The device for preparing drinking water by electrolysis in embodiment 9 is a variation on the basis of embodiment 6. As shown in FIG. 13 and FIG. 14, embodiment 9 is different from embodiment 6 in that, 1) the ultra-filtering membrane 5-2 facing the cathode 2 (departing from the anode 3) covers the entire surface of the anode 3; 2) the cathode 2 is formed with ϕ2 mm first through-holes 8; 3) the water-permeable membrane 5 (including the active carbon fiber membrane (felt) 5-1 and ultra-filtering membrane 5-2) is formed with second through-holes 9 with a diameter ϕ of 2.5 mm on one side facing the cathode 2.

Embodiment 10

Figure 15:
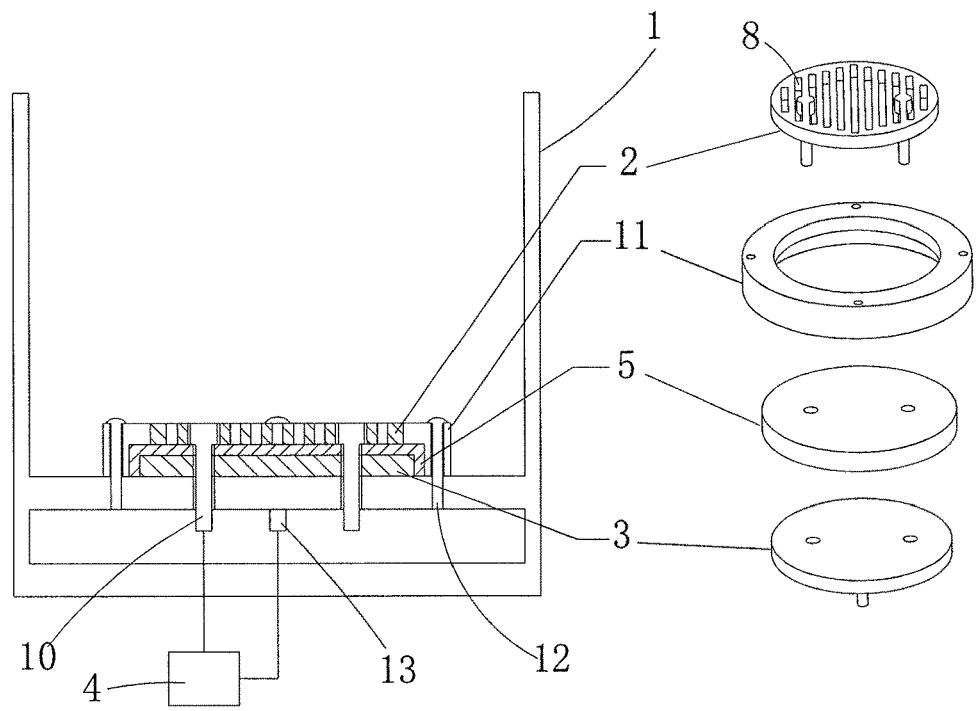
FIG. 15 is a combination of structural view and enlarged parts view of a device for preparing drinking water by electrolysis according to a tenth embodiment of the present invention.

The device for preparing drinking water by electrolysis of embodiment 10 is basically the same as that in embodiment 1. A shown in FIG. 15, embodiment 10 is different from embodiment 1 in that, 1) the distance δ between the water-permeable membrane 5 and the cathode 2 is 0 mm, namely the water-permeable membrane 5 tightly covers the cathode 2 and the anode 3; 2) both cathode 2 and anode 3 are round plane electrodes with a size of ϕ48 mm and a thickness of 1 mm; 3) the cathode 2 is uniformly distributed with comb-like first through-holes 8; 4) the anode 3 is installed at the bottom of the water container 1, and the cathode 2 concentrically penetrates the water-permeable membrane 5 and the anode 3 to be fixed with the bottom surface of the water container 1 through a positioning screw 10 (sheath+insulating jacket) and also compacts the water-permeable membrane 5; 5) the periphery of the anode 3 is added with a plastic outer frame 11 fixed by using a screw 12 for compacting the water-permeable membrane 5 on the anode 3 at the bottom surface of the water container 1 to realize reliable wrapping of the anode 3; in embodiment 10, the bottom surface of the anode 3 tightly fits the bottom surface of the water container 1, so the water-permeable membrane 5 covers the entire surface of the anode 3 except for the bottom surface; 6) the bottom surface of the anode 3 and the positioning screw 10 of the cathode 2 are welded with two uniform anode screws 13 at positions which form an angle of relative 90 DEG, and the positive and negative electrode leads of the external electrolysis power source are respectively connected to the positioning screw 10 and the anode screw 13.

The device for preparing drinking water by electrolysis in embodiment 10 was used to do the following test.

1. Test Conditions 1.1 The volume of the water container 1 was 100×100×300 mm.

1.2 The electrolysis power source 4 was a conventional 30V DC voltage-stabilized power supply (a self-made 30V DC pulse power supply with a high level and a narrow pulse width was prepared to make the contrast test).

1.3 In the following test, the observation methods of a plurality of indices are as follows.

(1) Classification of Bubbles in Water by Visual Inspection:

Bubbles in water are classified into 5 levels from zero to the relative maximum bubble amounts in the test.

(2) Determination of Oxidation Factors in Water

As mentioned above, oxidation factors exist in a very short time in water. The analysis selectivity and reliability of the existing test methods (for example chemical reaction method and capturing method) are undesirable. Meanwhile, considering that the device of the present invention is specially designed for treatment of water for daily use, the focus is on the change trend-scale macro effect of the oxidation factors. Therefore, to simplify the repeated test workload, a titrating solution has been researched and developed especially for qualitative determination of the sum of the oxidation factors in water. The self-made titrating solution in water, and the yellowing degree of the water are observed and then classified into 5 levels to judge the contents of the oxidation factors in water:

Color-less—Basically zero oxidation factor in the water, set as level 0;

Yellowest—Relative maximum oxidation factors in the water, set as level 5. Except for the color-less or the yellowest, the color in the middle is classified into levels 1, 2, 3 and 4 according to the yellowing degree.

The source water was water generated by an RO pure water machine, with a TDS=3 mg/L. The water container was injected with about 1.5 L of water. The electrolysis time was 5 min.

1. Test 1

Comparison of the case without membrane/the case with water-permeable membrane/the case with ionic member The water-permeable membrane 5 in the embodiment was used to do the water electrolysis test in the following three cases:

1) The water-permeable membrane 5 between the cathode 2 and the anode 3 was removed such that the cathode 2 and the anode 3 entered a membrane-less state and the distance between the cathode 2 and the anode 3 was adjusted to be 1.0 mm using the positioning screw 10 and a screw 12 (positioned by using an insulating cushion to keep the distance unchanged).

2) The water-permeable membrane 5 was a neutral ionic membrane, fully wrapped onto the anode 3 by using a pressing frame 6, and the distance δ between the membrane 5 and the cathode 2 was adjusted to be 0.7 mm using the positioning screw 10 and the screw 12.

3) The water-permeable membrane 5 was a PVDF ultra-filtering membrane, fully covering the anode, and the distance δ between the membrane 5 and the cathode 2 was adjusted to be 0.7 mm using the positioning screw 10 and the screw 12.

The source water used in the test was water generated by a commercially available RO pure water machine, with a TDS=3 mg/L and a pH=6.8, and the container was injected with about 1 L of water.

In the three cases, the electrolysis current was kept at 300 mA, and the electrolysis time was 15 min. The test results can be seen in the table 7.

TABLE 7

| Electrolysis mode | Current ma | Voltage V | Bubbles Visual inspection | Bubbles Main properties of bubbles | Dissolved hydrogen ppb | ORP mv 324 | Oxidation factors pH 6.8 | Oxidation factors Reagent titration |
|---|---|---|---|---|---|---|---|---|
| No membrane, small distance | 300 | 6.2 | Level 5 | Air | 187 | −225 | 6.7 | Level 5 |
| Fully covered with ionic membrane | | 14.6 | Level 1 | — | 225 | −365 | 7.1 | Level 0 |
| Fully covered with water-permeable membrane | | 7.8 | Level 4 | Hydrogen | 580 | −553 | 7.3 | Level 2 |

Test result analysis:
1. During the membrane-less small-distance electrolysis, non-selective low-voltage plasma discharging occurred; the majority of bubbles were air bubbles; and a lot of oxidation factors were generated.
2. During the electrolysis with the ionic membrane, plasma discharging did not occur, and basically no bubbles were generated Besides, as the oxidation separation potential at the anode increased, the power consumption also increased. In order to maintain the same electrolysis current, external voltage had to be greatly improved.
3. During the electrolysis where the water-permeable membrane fully and tightly covered the anode, a proper amount of oxidation factors were generated, and the majority of the bubbles in the water were hydrogen-enriched ultra-micro bubbles.

2. Test 2

The influences of the distance $\delta$ between the cathode and the water-permeable membrane on the working characteristics of the device were tested; and the water-permeable membrane 5 was a PVDF ultra-filtering membrane, which fully covered the anode 3. The distance $\delta$ between the cathode 2 and the water-permeable membrane 5 was respectively adjusted to five values, namely $\delta$=10, 7, 4, 1, 0 mm, by using the positioning screw 10 and the screw 12. The source water used in the test was water generated by a commercially available RO pure water machine, with a TDS=3 mg/L and a pH=6.8, and the container was injected with about 1 L of water. Under the various $\delta$ conditions, the electrolysis current was maintained at 300 mA, and the electrolysis time was 15 min. The test results can be seen in table 8.

3. Test 3

The influences of the degree of the water-permeable membrane covering the anode on the working characteristics of the device were tested.

The distance $\delta$ between the water-permeable membrane 5 and the cathode 2 was 0. The source water was tap water, with an IDS=160 mg/L and a pH=7.5, and the container was injected with about 1 L of water. The water-permeable membrane 5 was PVDF ultra-filtering membrane with a mean water-permeable aperture of 0.05 mm and a thickness of 0.5 mm.

$1^{st}$ Case: The PVDF ultra-filtering membrane fully covered the anode 3.

$2^{nd}$ Case: The PVDF ultra-filtering membrane was cut into round pieces having the same size as that of the cathode 2 and formed with identical comb-like holes. The directions of the comb-like holes were vertically crossed with those of the cathode 2. In this way, the PVDF ultra-filtering membrane partly covered the anode 3.

The electrolysis was carried out in the two cases for 15 min respectively. During the electrolysis, the electrolysis current in both was maintained at 300 mA. The test results can be seen in table 9.

TABLE 8

| Electrolysis mode | Current ma | Voltage V | Bubbles Visual inspection | Bubbles Main properties | Dissolved hydrogen ppb | ORP mv 324 | Oxidation factors pH 6.8 | Oxidation factors Reagent titration |
|---|---|---|---|---|---|---|---|---|
| $\delta$ = 10 | 300 | 16 | Level 3 | Hydrogen | 625 | −620 | 8.4 | Level 0 |
| $\delta$ = 7 | | 14 | Level 4 | Hydrogen | 630 | −610 | 8.3 | Level 0 |
| $\delta$ = 4 | | 11 | Level 5 | | 620 | −618 | 8 | Level 0 |
| $\delta$ = 1 | | 8 | Level 5 | Hydrogen, oxygen | 600 | −553 | 7.8 | Level 1 |
| $\delta$ = 0 | | 6.3 | Level 5 | Air, hydrogen, little oxygen | 505 | −464 | 7.1 | Level 2 |

Test result analysis:
1) In a certain range, as $\delta$ increased, bubbles and oxygen in the water increased, the reduction oxidation potential declined, the water became strongly alkaline, and oxidation factors were reduced.
a) $\delta$ approach d 0 and the oxidation factors in the treated water increased.

TABLE 9

| Mode | Current ma | Voltage V | Bubbles | | Dissolved hydrogen ppb | ORP mv 324 | PH 7.5 | Oxidation factors Reagent titration |
|---|---|---|---|---|---|---|---|---|
| | | | Visual inspection | Main properties | | | | |
| First case | 300 | 5.2 | Level 4 | Hydrogen | 411 | −298 | 8.2 | Level 2 |
| Second case | | 3.8 | Level 5 | Air, hydrogen | 376 | −212 | 7.7 | Level 4 |

Test result analysis:
1. Under the condition of full coverage, the strong oxidation factors in water were controlled to be reduced and the majority of the bubbles were hydrogen bubbles.
2. Under conditions of partial coverage, the smaller the coverage area was, the more the total bubbles in the water were and the more the oxidation factors were.

4. Test 4

The influences of changes in the anode materials on the working characteristics of the device were tested.

The following anodes were respectively used:

1) Inertia round-plate-like plane electrodes made from platinum-coated titanium oxides 2) Active carbon electrodes using formed nickel as the base, prepared the steps of: mixing active carbon with a large specific surface area and phenolic resin in a certain ratio, fully grinding the mixture to a size of below 200 m, blending the ground mixture uniformly, graining the mixture, pressing the mixture on the foamed nickel to prepare the round-plate-like electrodes with a thickness of about 1 mm, hot-pressing the electrodes at a temperature of 120° C. and a pressure of 5 MPa and heating the electrode to carbonize and mold the electrodes.

The water-permeable membrane 5 was a PVDF ultra-filtering membrane with a mean water-permeable aperture of 0.03 mm and a thickness of 0.5 mm. The membrane without a hole tightly and fully covered the anode 3. The distance δ between the water-permeable membrane 5 and the cathode 2 was 0.

The source water used in the test was tap water, with a TDS=160 mg/L and a pH=7.5, and the container was injected with about 1 L of water. The electrolysis was carried out for 15 min respectively in the case of inertia electrode and in the case of foamed nickel active carbon electrode. During the electrolysis, the electrolysis current in both was maintained at 300 mA. The test results can be seen in table 11.

Embodiment 11

Figure 16:
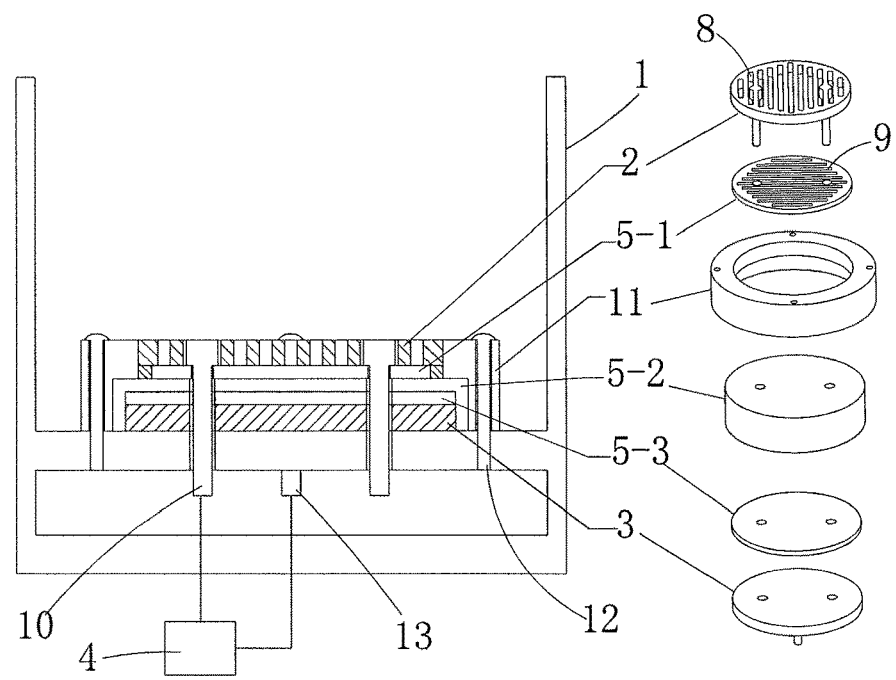
FIG. 16 is a combination of structural view and enlarged parts view of a device for preparing drinking water by electrolysis according to an eleventh embodiment of the present invention.

Embodiment 11 provides a healthy drinking water device. As shown in FIG. 16, the device is developed on the basis of the structure in embodiment 10. The container 1, the cathode 2 formed with the comb-like first through-holes 8 and the inertia anode 3 are the same. Embodiment 11 is different from embodiment 10 in that, the water-permeable membrane 5 is superimposed by three layers of membranes; the first layer is a PVDF ultra-filtering membrane 5-1 (with a mean water-permeable aperture of 0.03 mm and a thickness of 0.5 mm, cut into round pieces with the same size as that of the cathode) facing the cathode 2, the PVDF ultra-filtering membrane 5-1 is formed with comb-like second through-holes 9 at positions vertical to the comb-like first through-holes 8; the second layer (middle layer) is a PVDF ultra-filtering membrane 5-2 (with a mean water-permeable aperture of 0.05 mm and a thickness of 0.5 mm, without holes) which fully covers the anode 3; and the third layer is an active carbon fiber fabric 5-3 (with a specific surface area of 1,200 m²/g and a thickness of 1.8 mm when impacted after being immersed in water) which tightly fits the anode 3.

The container 1 was fully injected with tap water. The electrolysis was carried out for 8 min. The electrolysis current was maintained at 40-60 mA. The water samples were checked before and after the electrolysis, and the results can be seen in table 12 below.

TABLE 12

| Item | Result | |
|---|---|---|
| | Before electrolysis | After electrolysis |
| Mercury (Hg), mg/L | 0.00092 | 0.00047 |
| Cadmium (Cd), mg/L | 0.00019 | 0.00008 |

TABLE 11

| Electrolysis mode | Current ma | Voltage V | Bubbles | | Dissolved hydrogen ppb | ORP mv 324 | PH 7.5 | Oxidation factors Reagent titration |
|---|---|---|---|---|---|---|---|---|
| | | | Visual inspection | Main properties | | | | |
| Inertia anode | 300 | 5.2 | Level 5 | — | 411 | −298 | 8.2 | Level 3 |
| Foamed nickel active carbon anode | | 3.9 | Level 4 | Hydrogen | 677 | −512 | 9 | Level 0 |

Test result analysis:
When the anode was made from the active carbon material, the reaction products of the anode were strongly absorbed. Meanwhile, during the electrolysis, some nano-scale carbon particles may peel off and be released into the water, correspondingly reducing electrolysis power consumption.

TABLE 12-continued

| Item | Result | |
|---|---|---|
| | Before electrolysis | After electrolysis |
| Lead (Pb), mg/L | 0.00046 | 0.00029 |
| Arsenic (As), mg/L | 0.0037 | 0.0031 |
| Hexavalent chromium ($Cr^{6+}$), mg/L | <0.004 | <0.004 |
| Cyanide (CN), mg/L | <0.001 | <0.001 |
| pH | 7.34 | 8.25 |
| Residual chlorine ($CL_2$), mg/L | 0.78 | 0.11 |
| Total chlorine (CL), mg/L | 0.11 | 0.06 |
| Oxidation reduction potential (mv) | 357 | −289 |
| Dissolved hydrogen (ppb) | 0 | 538 |
| Nitrate ($NO_3^-$), mg/L | 8.19 | 5.67 |
| Sulfate ($SO_4^{2-}$), mg/L | 270 | 48 |
| Fluoride (F), mg/L | 0.47 | 0.21 |
| Total hardness ($CaCO_3$), mg/L | 132.6 | 81.2 |
| Content of *escherichia coli*, (CFU/ml) | 150,000 | 20,000 |

From the test results it can be seen that, the source water was greatly improved in the aspect of safety and health indices after being treated according to the embodiment.

Embodiment 12

Embodiment 12 is a water cup. The water cup adopts the device for preparing drinking water by electrolysis in the above embodiments.

Embodiment 13

Embodiment 13 is a kettle. The kettle adopts the device for preparing drinking water by electrolysis in the above embodiments.

Embodiment 14

Embodiment 14 is a water dispenser. The water dispenser adopts the device for preparing drinking water by electrolysis in the above embodiments.

Embodiment 15

Embodiment 15 is a thermos bottle. The thermos bottle adopts the device for preparing drinking water by electrolysis in the above embodiments.

Embodiment 16

Embodiment 16 is a water purifier. The water purifier adopts the device for preparing drinking water by electrolysis in the above embodiments.

Embodiment 17

Embodiment 17 is a boiler. The boiler adopts the device for preparing drinking water by electrolysis in the above embodiments.

Embodiment 18

Embodiment 18 is a tea making machine. The tea making machine adopts the device for preparing drinking water by electrolysis in the above embodiments.

The device for preparing drinking water by electrolysis of the present invention is not limited by the above specific technical schemes of the embodiments, for example, 1) two pairs of cathodes 3 and anodes 2 are acceptable); 2) the electrolysis power source 4 may be an AC pulse power source; 3) the water-permeable membrane 5 may be superimposed by three or more layers of membranes of different materials; 4) the shapes of the cathode 2 and the anode 3 may be round or other shapes; 5) in embodiment 6, the active carbon membrane 5-1 close to the anode 3 may be, or a water-permeable membrane made from graphite or other carbon materials; 6) the technical schemes of the above embodiments of the present invention can be crossly combined to form new technical schemes; etc. Technical schemes made by equivalent substitution all fall within the protective scope of the claims of the present invention.

What is claimed is:

1. A device for preparing drinking water by electrolysis, comprising a water container configured to contain water for drinking, at least one pair of a cathode and an anode coupled with each other and arranged within the water container, and an electrolysis power source used for supplying electricity to the cathode and the anode; wherein a water-permeable membrane that is water permeable is arranged between the coupled cathode and anode, and the water-permeable membrane covers the anode, a distance δ between the water-permeable membrane and the cathode being 0≤δ≤10 mm; and wherein the water-permeable membrane covers the entire surface of the anode.

2. The device for preparing drinking water by electrolysis according to claim 1, wherein the water-permeable membrane has water-permeable apertures which are smaller than or equal to 2 mm and greater than or equal to 1 nm.

3. The device for preparing drinking water by electrolysis according to claim 2, wherein the water-permeable membrane is compounded by superimposing at least two layers, one of which, close to the anode, is a water-permeable membrane made from carbon materials.

4. The device for preparing drinking water by electrolysis according to claim 2, wherein the water-permeable membrane is a single-layer water-permeable membrane, and the anode is an anode containing carbon materials.

5. The device for preparing drinking water by electrolysis according to claim 4, wherein the single-layer water-permeable membrane is an ultra-filtering membrane.

6. The device for preparing drinking water by electrolysis according to claim 4, wherein the single-layer water-permeable membrane is a water-permeable membrane made from carbon materials.

7. The device for preparing drinking water by electrolysis according to claim 4, wherein the anode is an anode made from carbon materials.

8. The device for preparing drinking water by electrolysis according to claim 4, wherein the anode is compounded by an inert anode made from platinum-coated titanium oxides and an inertia anode made from carbon materials, the inertia anode made from carbon materials being close to the cathode.

9. The device for preparing drinking water by electrolysis according to claim 1, wherein the cathode is formed with a first through-hole, and the aperture of the first through-hole is greater than 1 mm.

10. The device for preparing drinking water by electrolysis according to claim 1, wherein the water-permeable membrane is formed with a second through-hole, and the aperture of the second through-hole is greater than 2 mm.

11. The device for preparing drinking water by electrolysis according to claim 1, wherein the electrolysis power source is a DC pulse power source or an AC pulse power source with a high level and a narrow pulse width, and the forward voltage of the AC pulse power source is greater than the backward voltage.

12. The device for preparing drinking water by electrolysis according to claim 1,
    wherein δ=0 and
    the cathode is in direct contact with the water-permeable membrane.

13. The device for preparing drinking water by electrolysis according to claim 1,
    wherein the water-permeable membrane is an ultra-filtration membrane (UF), a nano-filtration membrane (NF), or a micro-filtration membrane (MF).

14. The device for preparing drinking water by electrolysis according to claim 1,
wherein the container contains water for drinking.

* * * * *